(12) United States Patent
Llamas Sandin et al.

(10) Patent No.: US 9,783,280 B2
(45) Date of Patent: Oct. 10, 2017

(54) DOUBLE-DECK AIRPLANE

(71) Applicants: AIRBUS OPERATIONS S.A.S., Toulouse (FR); AIRBUS OPERATIONS GMBH, Hamburg (DE); AIRBUS OPERATIONS LIMITED, Bristol (GB); AIRBUS OPERATIONS S.L., Getafe (Madrid) (ES)

(72) Inventors: Raúl Llamas Sandin, Getafe (ES); Lars Vollers, Hamburg (DE); Philip John Templeton Bradshaw, Bristol (GB); Thierry Salmon, Toulouse (FR)

(73) Assignees: Airbus Operations (SAS), Toulouse (FR); Airbus Operations GmbH, Hamburg (DE); Airbus Operations Limited, Bristol (GB); Airbus Operations S.L., Madrid (ES)

( * ) Notice: Subject to any disclaimer, the term of this patent is extended or adjusted under 35 U.S.C. 154(b) by 35 days.

(21) Appl. No.: 14/575,340

(22) Filed: Dec. 18, 2014

(65) Prior Publication Data

US 2015/0166166 A1 Jun. 18, 2015

(30) Foreign Application Priority Data

Dec. 18, 2013 (EP) ..................................... 13382527

(51) Int. Cl.
*B64C 1/00* (2006.01)
*B64D 11/06* (2006.01)
(Continued)

(52) U.S. Cl.
CPC .............. *B64C 1/00* (2013.01); *B64C 1/1423* (2013.01); *B64C 1/24* (2013.01); *B64D 11/0601* (2014.12);
(Continued)

(58) Field of Classification Search
CPC ......... B64C 1/00; B64C 1/24; B64D 11/0601; B64D 27/02
See application file for complete search history.

(56) References Cited

U.S. PATENT DOCUMENTS 5,829,836 A * 11/1998 Schumacher ...... B64D 11/0693
244/118.6
7,261,257 B2 * 8/2007 Helou, Jr. ................. B64C 1/00
244/118.1
(Continued)

FOREIGN PATENT DOCUMENTS

DE 197 57 025 7/1999
DE 19757025 * 7/1999 ............... B64D 9/00
(Continued)

OTHER PUBLICATIONS

Search Report for EP 13382527, dated May 8, 2014, 5 pages.

*Primary Examiner* — Justin Benedik
(74) *Attorney, Agent, or Firm* — Nixon & Vanderhye P.C.

(57) ABSTRACT

A double-deck airplane that facilitates passenger embarking/disembarking and cargo loading/unloading operations in order to maximize the number of flight missions carried out in a given time. The floors of its upper and lower decks are planar surfaces extending continuously inside the fuselage in at least the inner space of the fuselage intended for the payload; the lower deck is located at a height from the ground that allows carrying out passenger embarking/disembarking via equipment incorporated in the airplane without any external airport ground equipment; passenger and/or cargo compartments are distributed on the upper and/or lower decks; and the lifting structure is disposed in the airplane in a manner that none of its components crosses the upper and lower decks.

16 Claims, 8 Drawing Sheets

(51) Int. Cl.
  *B64D 27/02* (2006.01)
  *B64C 1/14* (2006.01)
  *B64C 1/24* (2006.01)
  *B64C 25/12* (2006.01)

(52) U.S. Cl.
  CPC .......... *B64D 11/0639* (2014.12); *B64D 27/02* (2013.01); *B64C 2001/0027* (2013.01); *B64C 2025/125* (2013.01)

(56) References Cited

U.S. PATENT DOCUMENTS

| | | | |
|---|---|---|---|
| 8,459,592 B2 * | 6/2013 | Pahl ........................... | 244/118.1 |
| 2005/0247824 A1 * | 11/2005 | Allison, Sr. ............ | B64D 11/00 244/137.2 |
| 2009/0224103 A1 * | 9/2009 | Neumann .......... | B64D 11/0023 244/131 |

FOREIGN PATENT DOCUMENTS

| | | |
|---|---|---|
| EP | 0 514 650 | 11/1992 |
| FR | 1 473 111 | 3/1967 |

\* cited by examiner

DOUBLE-DECK AIRPLANE

This application claims priority to EP 13382527.3 filed 18 Dec. 2013, the entire contents of which is hereby incorporated by reference.

FIELD OF THE INVENTION

This technology herein relates to commercial airplanes and more particularly to double-deck airplanes for transporting passengers and/or cargo.

BACKGROUND OF THE INVENTION

Commercial airlines are continuously demanding airplanes that maximize revenue while reducing operational costs. It is likewise demanded that new airplanes comply with the current and future environmental standards.

This demand requires airplanes having low fuel consumption and being configured so as to facilitate efficient passenger embarking/disembarking and cargo loading/unloading operations in order to maximize the number of flight missions carried out in a given time. It is also required that aircraft design allows optimum use of internal volumes for a wide range of different airlines that have different requirements in terms of passengers, baggage and freight capacity.

Double-deck airplanes are one of the available options to meet that demand because in classical commercial aircraft configurations with an upper deck dedicated almost exclusively to carrying passengers and a lower hold only dedicated to cargo transportation it is not possible, for example, to use the empty cargo space to carry more passengers on a flight with no or little cargo being transported.

US 2004/0075025 describes an aircraft comprising an upper deck, a multipurpose lower deck and a wing structure passing through the lower deck area which leads to having separated front and aft portions on the lower deck. Thus the flexibility of use and the volume of the lower deck are limited by the presence of the wing.

US 2013/0099053 describes a double-deck airplane with a mid-wing. The airplane is configured with an upper compartment for passengers and a lower compartment with a frontal portion for passengers, a rear portion for cargo and an intermediate portion for the wing box and other facilities. This configuration is determined by the use of high bypass ratio turbofan engines or open rotor engines mounted on the underside of the wing and has the drawback that the wing box occupies a useful space for passengers or cargo inside the fuselage.

The technology herein is directed to solving all the problems mentioned above.

SUMMARY OF THE INVENTION

It is an object of the present invention to provide an airplane that facilitates passenger embarking/disembarking and cargo loading/unloading operations in order to maximize the number of flight missions carried out in a given time.

It is another object of the present invention to provide an airplane whose internal space can be distributed in a flexible manner between passenger and cargo compartments.

These and other objects are met by a double-deck airplane with the following features:
the floors of the upper and lower decks are planar surfaces extending continuously inside the fuselage in at least the inner space of the fuselage intended for the payload;
the lower deck is located at a height from the ground that allows carrying out passenger embarking/disembarking autonomously without any specific airport ground equipment;
passenger and/or cargo compartments are distributed throughout the upper and/or lower decks;
the lifting structure is disposed in the airplane in a manner that none of its components crosses the upper and lower decks.

In an embodiment the passenger and cargo compartments are separated by at least a movable partition wall. Advantageously the airplane comprises one passenger compartment and a cargo compartment whose dimensions can be adjusted to the airline needs by moving the partition wall. Foldable seats installed on guides in a sliding manner may be used to increase/reduce the dimension of a passenger compartment.

In an embodiment the airplane is provided with at least lower doors accessible from ground and upper doors accessible from jetways for speeding the passenger embarking/disembarking and cargo loading/unloading operations.

In an embodiment the lower access doors to a passenger compartment are doors incorporating airstairs so that they can be used as passenger embarking/disembarking stairs from/to the ground.

The airplane of the invention can have different lifting structures, propulsion systems and landing gear arrangements.

The lifting structures in particular are based on a low wing or a high wing disposed so as not to interfere with the passenger and/or cargo compartments and a suitable empennage.

Other characteristics and advantages of the present invention will be clear from the following detailed description of embodiments illustrative of its object in relation to the attached figures.

DETAILED DESCRIPTION OF THE INVENTION

Figure 1:
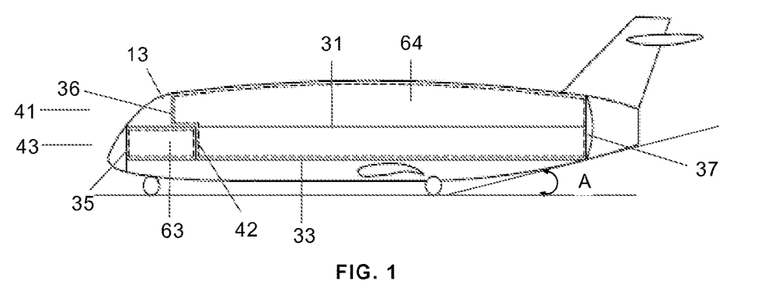
FIG. 1 is a schematic sectional view illustrating the basic interior configuration of an exemplary airplane of the invention.

As illustrated in FIG. 1, the basic features of the interior configuration of an exemplary double-deck airplane of the invention are that:

the floors 31, 33 of upper and lower decks 41, 43 are flat surfaces that extend continuously in at least the inner space of the fuselage 13 intended for the payload which is delimited by the front end sections 36, 35 and the rear end section 37;

the lower floor 33 is located at a height close enough to the ground so that at least in part the passenger embarking/disembarking can take place autonomously without any specific airport ground equipment, for instance by using air-stairs incorporated in the doors that can rotate up and down;

at least a partition wall 42 on the upper deck 41 or on the lower deck 43 is used to separate passengers and cargo compartments 64, 63 (delimited by dashed lines).

In the particular configuration shown in FIG. 1, the passenger compartment 64 occupies the space comprised between the front end section 36 and the rear end section 37 in the upper deck 41 and the space comprised between the partition wall 42 and the rear end section 37 in the lower deck 43. The cargo compartment 63 occupies the space comprised between the front end section 35 and the partition wall 42 in the lower deck 43. On the other hand, the upper floor 31 extends beyond the front end section 36 delimiting a space for the cockpit while the lower floor 33 is limited by front end section 35 and the rear end section 37.

The partition wall 42 can be located in different positions along the fuselage axis to modify the space allocated to the passengers and cargo compartments 64, 63.

This configuration provides maximum flexibility for airlines to manage the payload space since the upper and lower decks 41, 43 with flat floors 31, 33 may be used, in whole or in part, as passenger or cargo compartments. Cargo can be carried on the lower deck 43 but also on the upper deck 41 by means of the same procedures used in certain modified versions of known commercial aircraft which are provided with a large cargo door giving access to the upper deck and can carry palletized or bulk cargo loaded by special ground equipment.

Figure 2A:
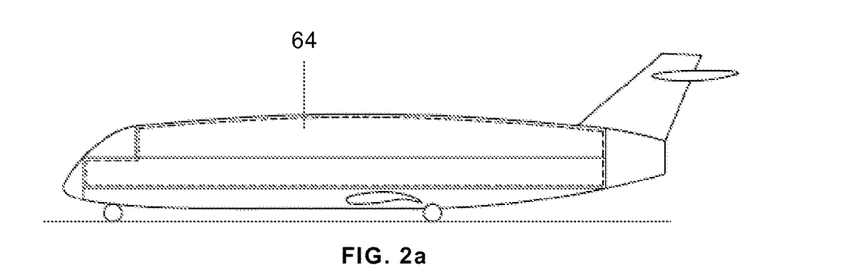
FIGS. 2a, 2b, 2c, 2d are schematic sectional views illustrating four possible distributions of space dedicated to passengers and cargo in exemplary airplanes of the invention.
Figure 2B:
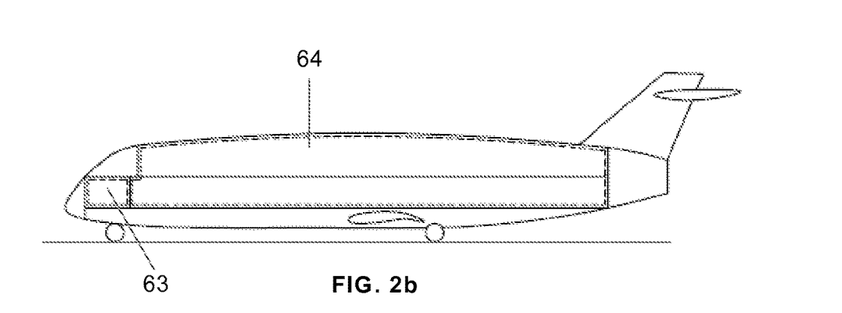
Figure 2C:
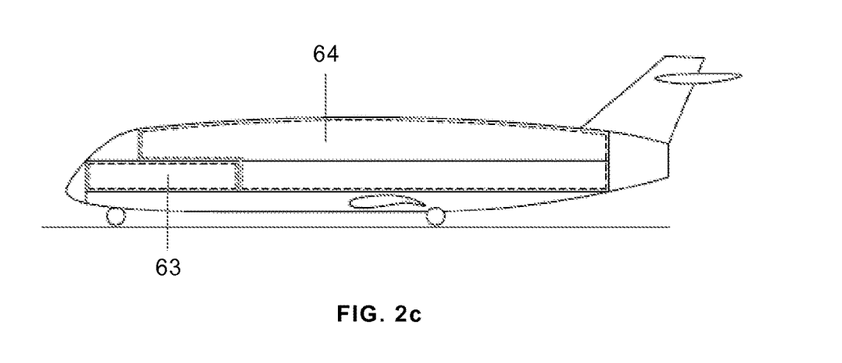
Figure 2D:
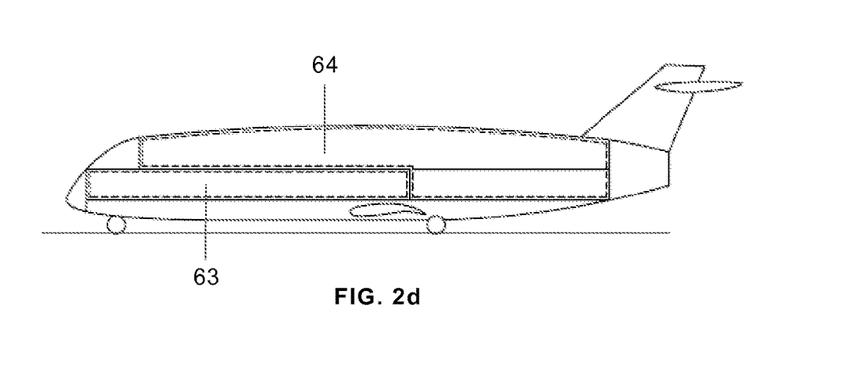

The flexibility of the split between passengers and cargo compartments 64, 63 is ensured by the partition wall 42 that can be installed at different positions along the fuselage axis depending on the airline's needs. As the floors 31, 33 are flat and continuous there is a total flexibility from the front end sections 36, 35 to the rear end section 37. In this respect FIG. 2a shows an airplane configured with only a passenger compartment 64 and FIGS. 2b-2d show airplanes configured with a passenger compartment 64 in the upper deck 41 and in part of the lower deck 43 and a cargo compartment 63 in the lower deck 43 of different dimensions.

This flexibility can be used in different operating scenarios:

A first scenario is to have each airline choosing individually its own cabin layout with a given distribution of passenger and cargo compartments 64, 63 by choosing a specific position for the partition wall 42. Once configured, this cabin layout remains the same for the whole life of the aircraft unless an important overhaul is performed on the airplane including a change of the cabin arrangement.

A second scenario can be to modify the airplane arrangement overnight at the airline base by moving the partition wall 42 and by adding or removing passenger seats into/from the passenger compartment 64 of the aircraft.

Figure 3A:
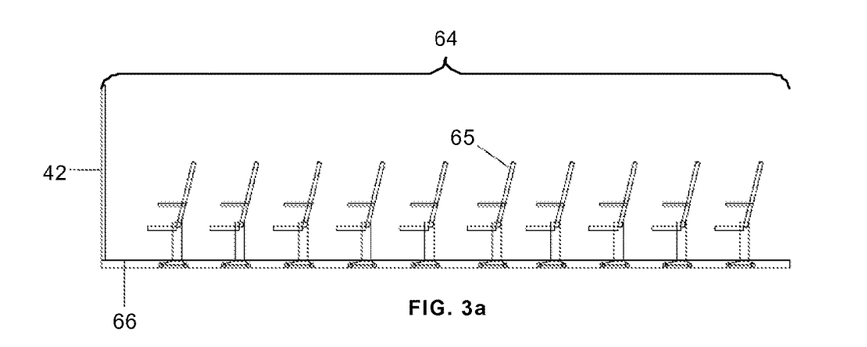
FIGS. 3a and 3b are schematic sectional views illustrating, respectively, a space dedicated to passengers only and the same space dedicated to passengers and cargo using foldable seats for passengers.
Figure 3B:
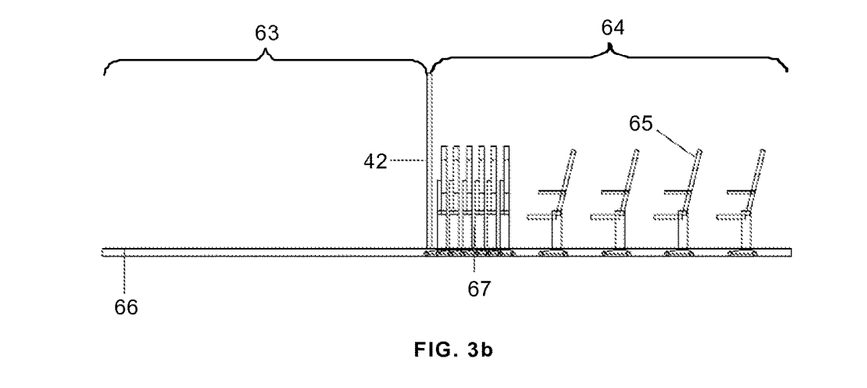

In a third scenario, the airlines benefit from this flexibility between every flight. As shown on FIGS. 3a and 3b, the seats 65 are not moved in or out of the cabin when the passengers compartment 64 is increased or reduced but remain in the cabin whatever the cabin configuration. The partition wall 42 (a sliding wall or a net) can be moved to the right position by the cabin crew and the affected seats 65 are flattened or un-flattened depending on the cabin layout. When more cargo space is needed the affected seats are flat folded, sliding on guides 66 embedded in the floor and stacked next to each other. The partition wall 42 is then moved next to the folded seats 67 to free some space for the cargo compartment 63. When less cargo space is needed, the operations above are reversed.

Another basic feature of the exemplary double-deck airplane is that the bottom part of the fuselage 13 is very close to the ground and its rear part has a proper inclination angle A (see FIG. 1) to avoid a tail-strike during the takeoff or landing. The shorter length of the double deck fuselage of the exemplary airplane compared to a single deck aircraft of the same passenger capacity facilitates having the bottom part of the fuselage 13 very close to the ground while still attaining a good rotation angle at take-off or landing.

As in known configurations of double-deck airplanes, the fuselage 13 may be of ovoid or of double-bubble type cross section.

Figure 4:
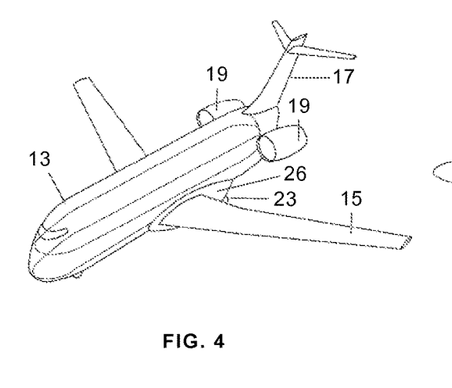
FIG. 4, FIG. 5 and FIG. 6 are perspective, frontal and plan schematic views of a first embodiment of the airplane of the invention.
Figure 5:
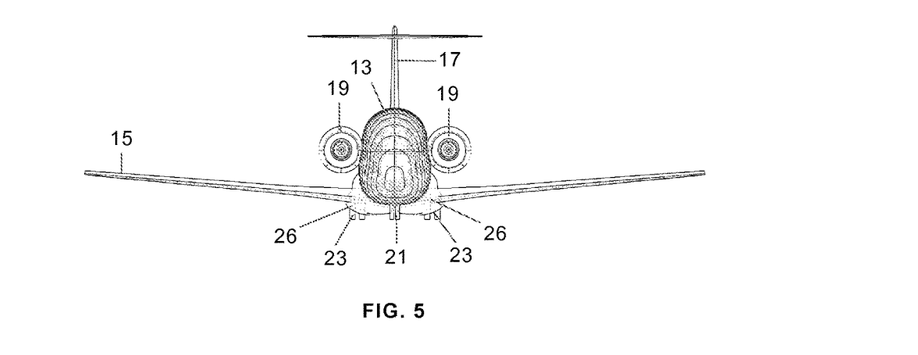
Figure 6:
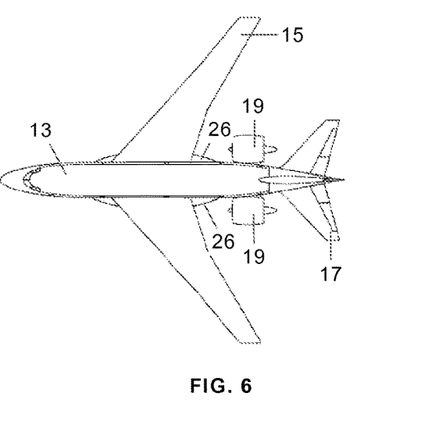

A first example embodiment of the invention (see FIG. 4, FIG. 5 and FIG. 6) has the following features:

Having a lifting structure formed by a low wing 15 (its central box being located under the lower floor 33) and a T-shaped empennage 17.

Having a propulsion system formed by engines 19 mounted at the rear part of the fuselage 13.

Having a nose landing gear 21 under the forward fuselage and a main landing gear 23 mounted on the underside of the fuselage 13 that is provided with fairings 26 to house the main landing gear 23.

Figure 7:
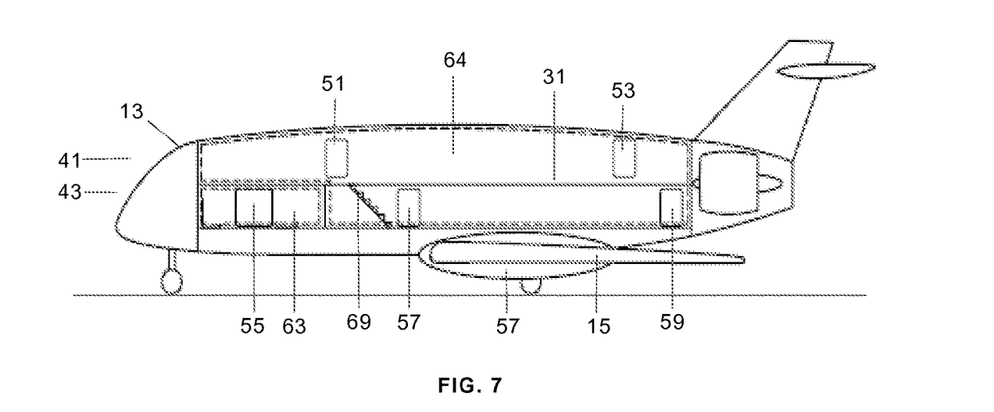
FIG. 7 is a schematic sectional view of the first embodiment of the airplane of the invention.

FIG. 7 shows a possible arrangement of the space provided for the payload in this embodiment. The upper deck 41 houses the upper part of the passenger compartment 64 with two access doors 51, 53 on each side and the lower deck 43 houses a forward cargo compartment 63 with an access door 55 on one side and the lower part of the passenger compartment 64 with two access doors 57, 59 on each side. The configuration shown in FIG. 7 also includes an interior stairway 69 communicating the upper and lower part of the passenger compartment 64.

Figure 8:
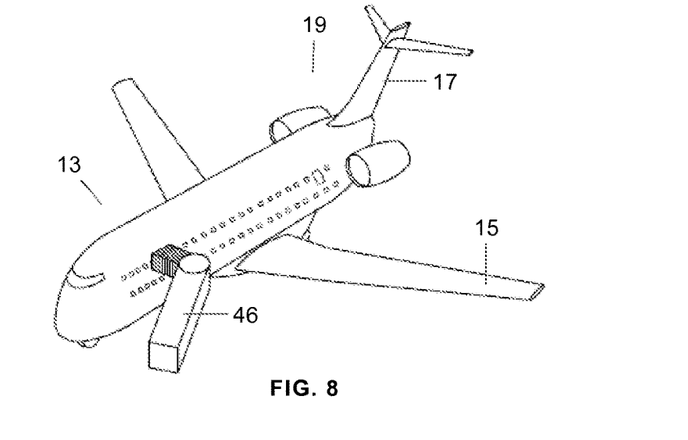
FIG. 8 is a perspective view of the first embodiment illustrating the aircraft access from the upper front door by mean of a jetway.
Figure 9:
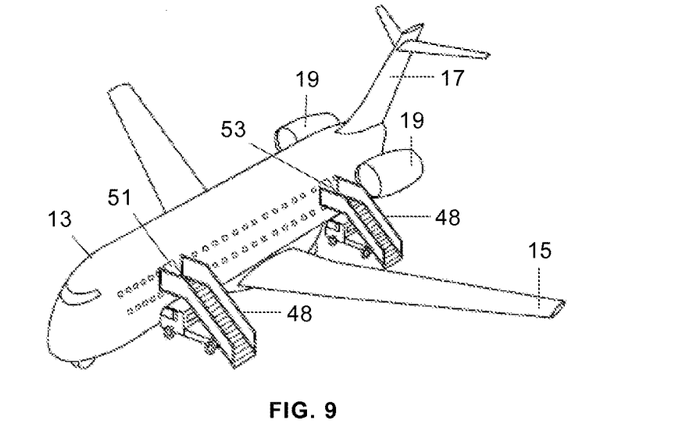
FIG. 9 is a perspective view of the first embodiment illustrating the aircraft access from the upper doors by mean of boarding stairs as part of the airport ground equipment.

This configuration allows passenger embarking/disembarking operations to/from the upper part of the passenger compartment 64 to be made through the upper doors 51, 53 using airport ground equipment such as a jetway 46 for door 51 (see FIG. 8) or boarding stairs 48 for doors 51, 53 (see FIG. 9).

Figure 10:
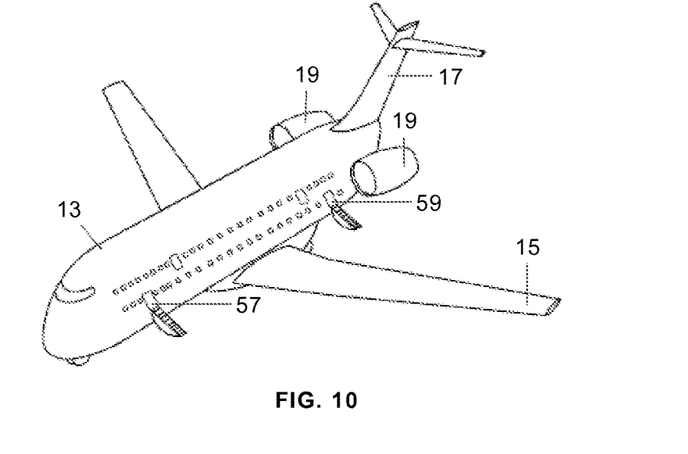
FIG. 10 is a perspective view of the first embodiment illustrating the aircraft access from lower doors with airstairs.
Figure 11:
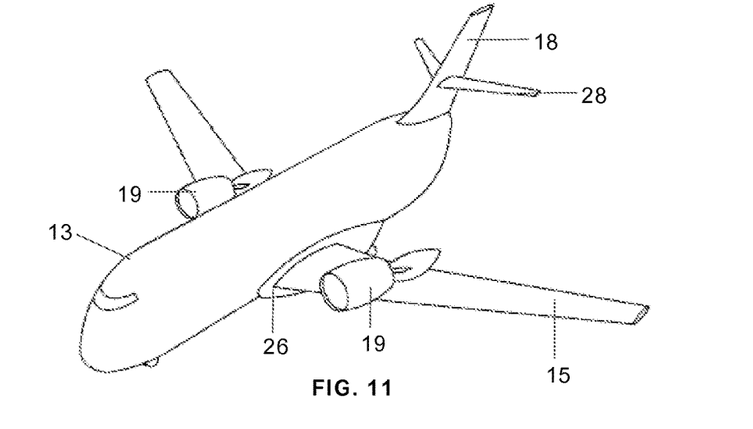
FIG. 11, FIG. 12, FIG. 13 and FIG. 14 are perspective, frontal, plan and side schematic views of a second embodiment of the airplane of the invention.
Figure 12:
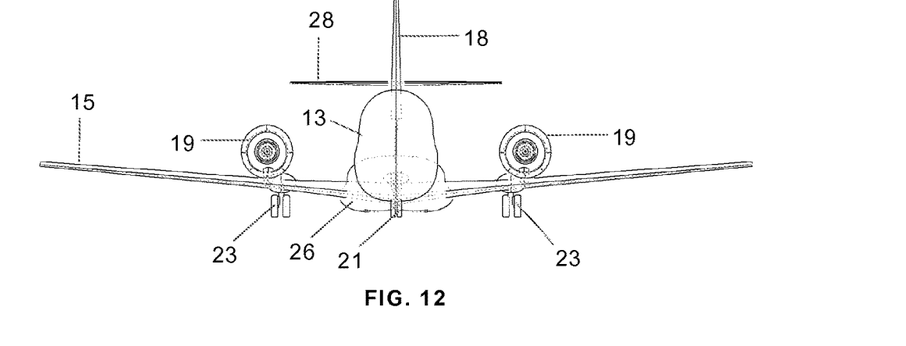
Figure 13:
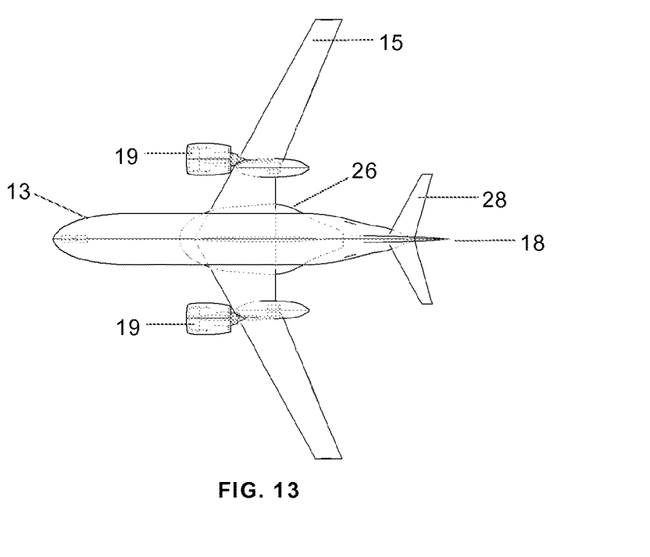
Figure 14:
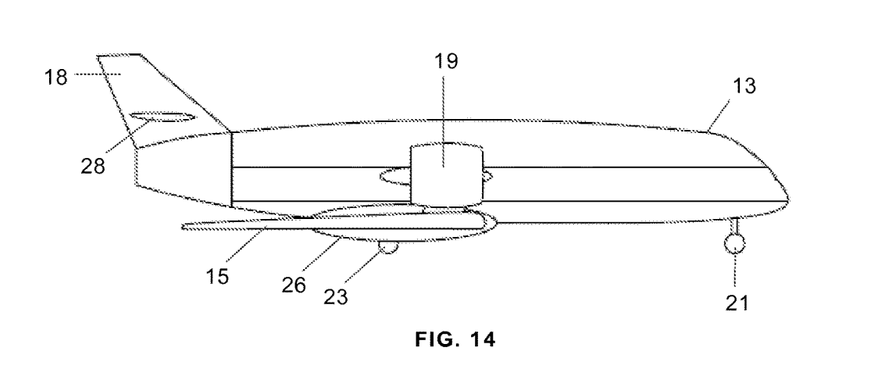

The passenger embarking/disembarking operations to/from the lower part of the passenger compartment 64 can be done through the lower doors 57, 59 using airport ground equipment or autonomously including airstairs in the lower doors (see FIG. 10).

The internal stairway 69 allows transfer of passengers from the upper deck 41 to the lower deck 43 and vice versa during embarking/disembarking operations. It is, then, possible to use only upper doors 51, 53 or only lower doors 57, 59 for the passengers embarking disembarking procedure of the full aircraft. When using lower doors only 51, 53, it is possible to have fully autonomous embarking/disembarking process without using any airport equipment (boarding stairs, jetways) as the lower doors are equipped with integrated airstairs.

On the other hand, the simultaneous use of upper and lower doors 51, 53; 57, 59 allow fast embarking/disembarking process.

A second example embodiment of the invention (see FIG. 11, FIG. 12, FIG. 13 and FIG. 14) has the following features:
  Having a lifting structure comprising a low wing 15 (its central box being located under the lower deck 33) and an empennage formed by a vertical tail plane 18 and a horizontal tail plane 28.
  Having a propulsion system comprising two engines 19 mounted over the low wing 15 on each side of the fuselage 13 in a forward location with respect to the low wing 15.
  Having a nose landing gear 21 and a main landing gear 23 mounted on the underside of the low wing 25 that is provided with fairings 26 arranged in its rear part to house the main landing gear 23.

The interior space of the fuselage 13 may be arranged in a manner very similar to that shown in FIG. 7 except for the location of the access doors to the upper and lower decks 41, 43.

Figure 15:
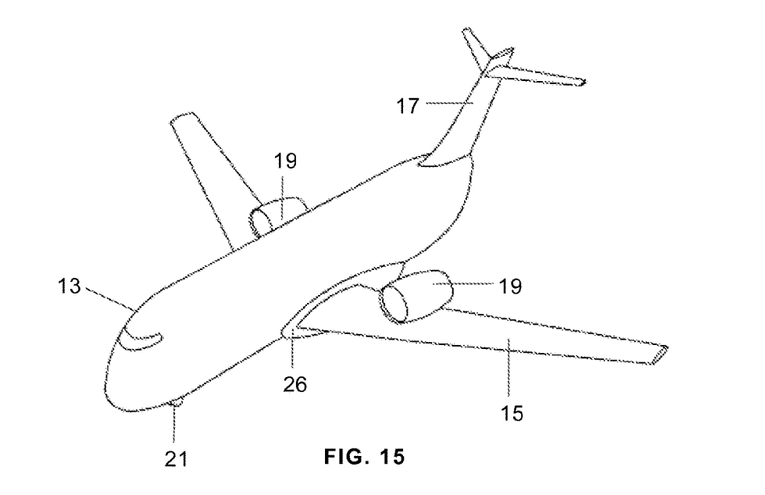
FIG. 15 is a perspective view of a third embodiment of the airplane of the invention.

A third embodiment of the invention (see FIG. 15) is similar to the second embodiment with the exception that the two engines 19 are mounted over the low wing 15 on each side of the fuselage 13 in an aft location with respect to the wing and in that the empennage is a T-shaped empennage 17.

Figure 16:
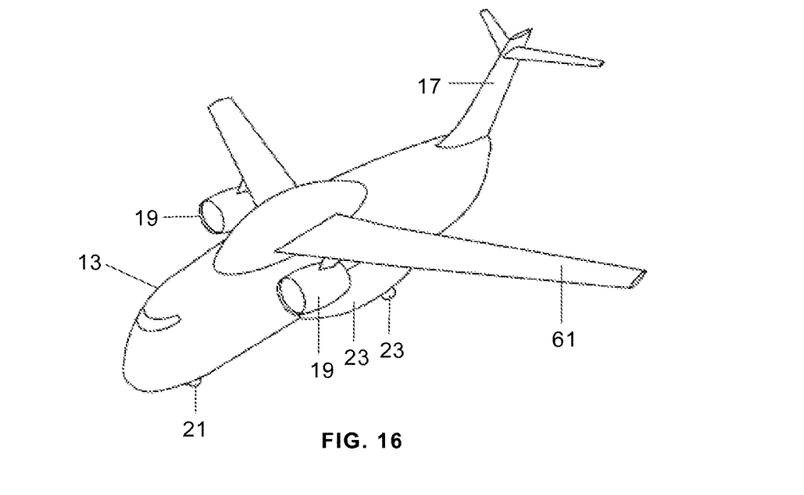
FIG. 16 and FIG. 17 are perspective and side schematic views of a fourth embodiment of the airplane of the invention.
Figure 17:
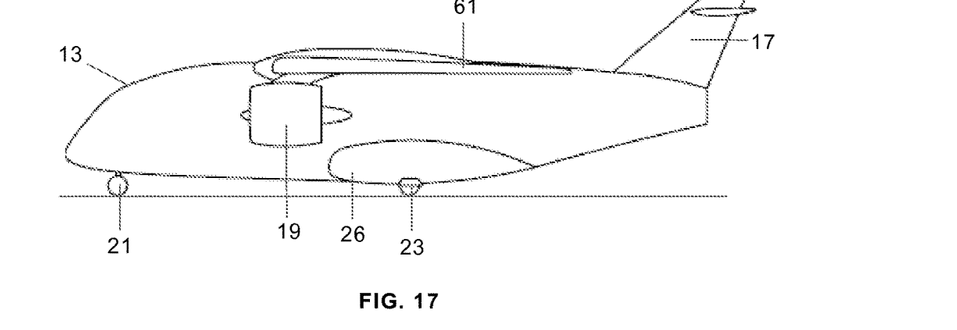

A fourth example embodiment of the invention (see FIG. 16 and FIG. 17) has the following features:
  Having a lifting structure comprising a high wing 61 (its central box being located above and not protruding the upper deck 41) and a T-shaped empennage 17.
  Having a propulsion system comprising two engines 19 mounted under the high wing 61 on each side of the fuselage 13.
  Having a nose landing gear 21 and a main landing gear 23 mounted on the underside of the fuselage 13 that is provided with fairings 26 to house the main landing gear 23.

Figure 18:
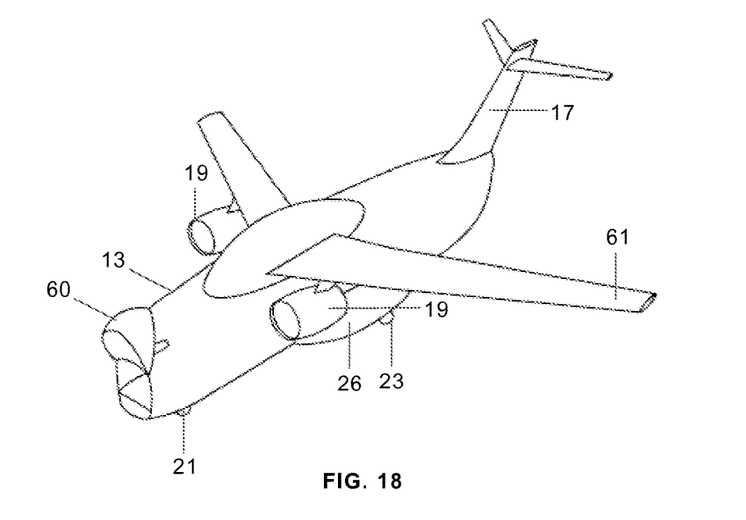
FIG. 18 is a perspective front view of an alternative arrangement of the fourth embodiment of the airplane of the invention with a front cargo door located in the nose area.
Figure 19:
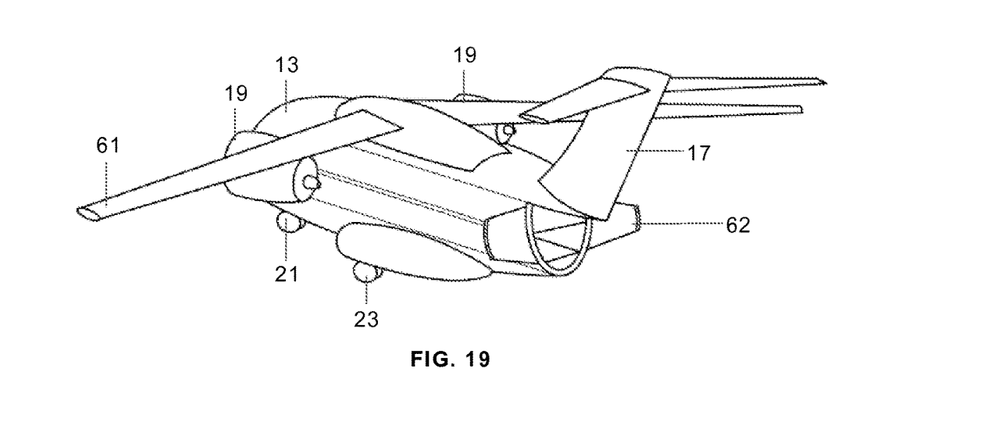
FIG. 19 is a perspective rear view of an alternative arrangement of the fourth embodiment of the airplane of the invention with a cargo door located in the rear end area.

FIG. 18 shows an alternative arrangement of the fourth embodiment with a portion 60 of the frontal fuselage configured as an access door to the forward lower deck 43 when this is used as a cargo compartment. This frontal door is an alternative arrangement to the side cargo access door 55 as shown in FIG. 7. As a second alternative, FIG. 19 shows a portion 62 of the rear fuselage configured as a door in the aft part of the fuselage that can be used to load and unload the cargo when the cargo compartment 63 is located at the rear of the fuselage.

Figure 20A:
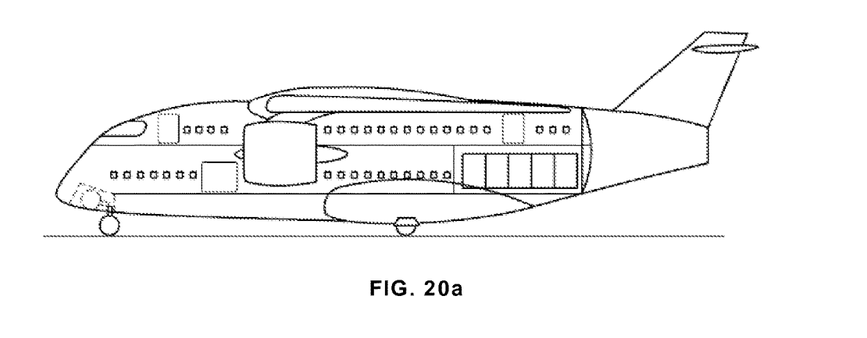
FIGS. 20a, 20b, 20c are side views of the fourth embodiment showing possible cargo and passenger arrangements and the impact on the overall passenger capacity and cargo volume.
Figure 20B:
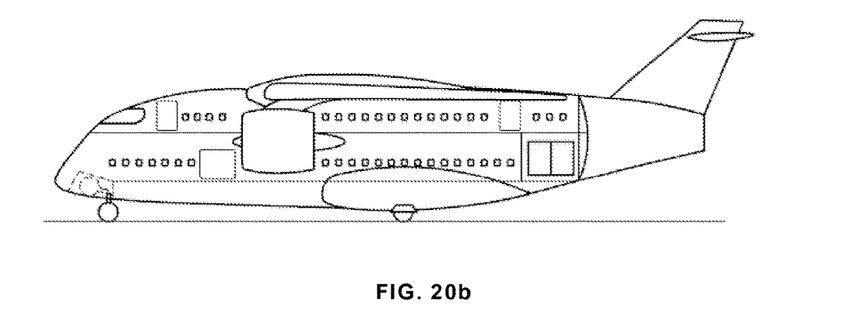
Figure 20C:
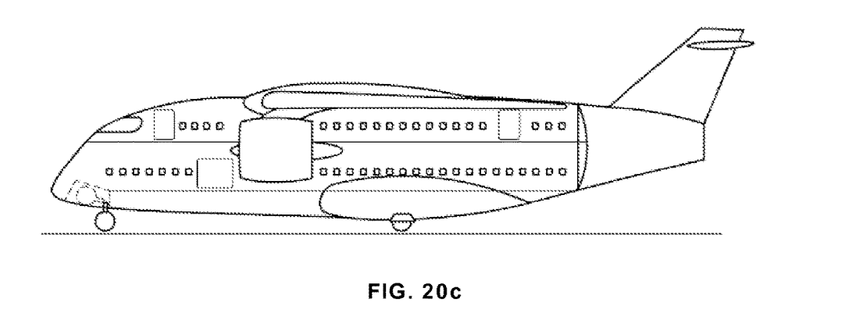

Finally FIG. 20 shows three different cabin arrangements of the passenger and cargo compartments 64, 63 on the fourth embodiment illustrating its impact on the passenger capacity and cargo volume.

Overall the example airplanes of the invention can reduce the operational costs of the transportation of passengers and cargo by virtue of a greater payload capacity for a given fuselage length as the space inside the fuselage 13 intended for the payload is maximized. For the same reason the wetted area is reduced compared to a conventional single deck aircraft of same capacity. This enables an improved aerodynamic efficiency and a reduction of the fuel burn in flight. Finally the flexible distribution between passengers and cargo as well as its capacity to reduce the time used in the passenger embarking/disembarking and cargo loading/unloading operations is also an mean to improve the economic efficiency of the aircraft.

Although the present invention has been described in connection with various embodiments, it will be appreciated from the specification that various combinations of elements, variations or improvements therein may be made, and are within the scope of the invention.

The invention claimed is:

1. A double-deck airplane for transporting passengers and/or cargo comprising a fuselage, a upper deck, a lower deck, a movable partition wall on the upper deck or the lower deck, a lifting structure, landing gears and a propulsion system, wherein:
  floors of the upper and lower decks are planar surfaces extending continuously inside the fuselage in at least an inner space of the fuselage configured for a payload, wherein the upper and lower decks each extends in a plane continuously from a front section of the fuselage to an empennage section of the airplane;
  the lower deck is located at a height from the ground, while the aircraft is on the ground, configured to carry out passenger embarking/disembarking via equipment incorporated in the airplane without any external airport ground equipment;
  passenger or cargo compartments are distributed on the upper and lower decks;
  the lifting structure is disposed in the airplane in a manner that no component of the lifting structure crosses the upper and lower decks;
  the movable partition wall is configured to separate the passenger compartment from the cargo compartment, the movable partition wall extends from the floor of the lower or upper deck to a ceiling of the lower or upper deck and extends transversely from a left wall to a right wall of the fuselage, and the movable partition wall is movable along a longitudinal direction of the fuselage; and
  a distribution of the inner space allocated to the passengers and/or cargo compartments is changeable by locating the partition wall at different positions along the longitudinal direction of the fuselage.

2. The double-deck airplane according to claim 1, wherein the seats of the passenger compartments are foldable seats that are installed on guides such that they can be folded/unfolded and moved along the longitudinal direction of the fuselage for their accommodation to a position of the movable partition wall.

3. The double-deck airplane according to claim 1, wherein the fuselage has at least lower doors accessible from ground via equipment incorporated in the airplane and upper doors accessible from jetways or boarding stairs.

4. The double-deck airplane accordingly to claim 1, wherein
the fuselage has at least one lower door to at least one of the passenger compartments, the lower access door including built-in stairs so that the lower access door can be used for embarking/disembarking passengers directly from/to the ground.

5. The double deck airplane according to claim 1, wherein:
the lifting structure comprises a low wing and a T-shaped section at the empennage; and
the propulsion system comprises engines mounted to a rear part of the airplane.

6. The double-deck airplane according to claim 5, wherein the landing gears comprise a nose landing gear and a main landing gear that are housed in fairings attached to the fuselage.

7. The double-deck airplane according to claim 5, wherein the landing gears comprise a nose landing gear and a main landing gear housed under the low wing.

8. The double-deck airplane according to claim 1, wherein:
the lifting structure comprises a low wing and the empennage formed by a vertical tail plane and a horizontal tail plane located at an intermediate position of the vertical tail plane;
the propulsion system comprises engines mounted to the upper side of the low wing at each side of the fuselage in a forward location with respect to the low wing; and
the landing gears comprise a nose landing gear and a main landing gear housed in the low wing.

9. The double-deck airplane according to claim 1, wherein:
the lifting structure comprises a low wing and a T-shaped section at the empennage;
the propulsion system comprises engines mounted to the upper side of the low wing at each side of the fuselage in a rearward location with respect to the low wing; and
the landing gears comprise a nose landing gear and a main landing gear housed in fairings attached to the fuselage.

10. The double-deck airplane according to claim 1, wherein:
the lifting structure comprises a high wing and a T-shaped section of the empennage;
the propulsion system comprises engines mounted under the high wing at each side of the fuselage; and
the landing gears comprise a nose landing gear and a main landing gear housed in fairings attached to the fuselage.

11. The double-deck airplane according to claim 10, wherein a front portion of the fuselage includes an access door to the lower deck and the access door is aligned with the longitudinal direction of the fuselage when opened.

12. The double-deck airplane according to claim 10, wherein a rear portion of the fuselage is configured as a two-part access door to the lower deck arranged such that each part of the two-part access door is opened in a direction transverse to the longitudinal direction of the fuselage.

13. The double-deck airplane according to claim 1, wherein the cockpit is located on the upper deck in a frontal portion of the fuselage.

14. A double-deck airplane comprising:
a fuselage including an upper deck and a lower deck;
floors of the upper and lower decks that extend continuously in at least a payload space of the fuselage, the upper and lower decks extending continuously from a front region of the fuselage to an empennage region of the airplane,
wherein the payload space of the fuselage is dividable into a passenger compartment and a cargo compartment;
an adjustable divider separates the passenger compartment from the cargo compartment, the adjustable divider extends from the floor of the lower or upper deck to a ceiling of the lower or upper deck and extends transversely from a left wall to a right wall of the fuselage, and the adjustable divider is movable along a longitudinal direction of the fuselage,
wherein a distribution of the payload space allocated to the passenger and cargo compartments is changeable by locating the divider at different positions along the longitudinal direction of the fuselage;
a wing structure extending outwards from opposite sides of the fuselage, wherein the wing structure is configured to avoid the payload space; and
embarking/disembarking equipment in the fuselage and configured to be deployed while the aircraft is on the ground, wherein the lower deck is located at a height from the ground, while the aircraft is on the ground, that allows embarking/disembarking passengers from the lower deck via the embarking/disembarking equipment without external ground equipment.

15. The double-deck airplane according to claim 14, wherein the adjuster divider is a movable partition wall.

16. The double-deck airplane according to claim 14, wherein the embarking/disembarking equipment incorporated in the airplane includes rollable stairs in a door of the fuselage adjacent the lower deck.

* * * * *